US012004536B2

(12) United States Patent
Lagally et al.

(10) Patent No.: US 12,004,536 B2
(45) Date of Patent: *Jun. 11, 2024

(54) FOODSTUFF PROCESSING APPARATUS

(71) Applicant: Seattle Food Tech, Inc., Seattle, WA (US)

(72) Inventors: Christie Lagally, Seattle, WA (US); Julia O'Donnell, Seattle, WA (US); Chloe Grubb, Seattle, WA (US)

(73) Assignee: Seattle Food Tech, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/880,927

(22) Filed: Aug. 4, 2022

(65) Prior Publication Data

US 2022/0369667 A1 Nov. 24, 2022

Related U.S. Application Data

(63) Continuation of application No. 17/518,568, filed on Nov. 3, 2021, now Pat. No. 11,432,564, which is a
(Continued)

(51) Int. Cl.
*A23J 3/00* (2006.01)
*A23J 3/14* (2006.01)
(Continued)

(52) U.S. Cl.
CPC .............. *A23J 3/227* (2013.01); *A23J 3/14* (2013.01); *A23L 27/88* (2016.08); *A23L 29/212* (2016.08);
(Continued)

(58) Field of Classification Search
CPC .... B01F 25/901; B01F 27/1143; B01F 23/59; B01F 31/445; B01F 35/92; B01F 27/112;
(Continued)

(56) References Cited

U.S. PATENT DOCUMENTS 3,558,324 A 1/1971 Page et al.
4,352,567 A 10/1982 Guibert
(Continued)

FOREIGN PATENT DOCUMENTS

WO 2012021936 A1 2/2012

OTHER PUBLICATIONS

International Search Report and Written Opinion of the International Search Authority in International Application No. PCT/US2021/057950, mailed Jun. 30, 2022.
(Continued)

*Primary Examiner* — Anshu Bhatia
(74) *Attorney, Agent, or Firm* — Cognition IP, P.C.; Edward Steakley; Justin White

(57) ABSTRACT

An apparatus configured to process foodstuff materials can include an exterior tube, an inner shaft, and multiple differently shaped protrusions. The exterior tube can have a foodstuff inlet, an outlet, and a longitudinal axis, and can be configured to facilitate the conveyance of foodstuff materials along a material passage from the foodstuff inlet to the outlet. The inner shaft can be located within the exterior tube, can extend along the longitudinal axis, and can combine with the exterior tube to define the material passage. The inner shaft can be configured to be rotationally driven. The multiple differently shaped protrusions can be coupled to and extend from the inner shaft, and these differently shaped protrusions can be configured to process the foodstuff materials when the inner shaft is rotationally driven. Processing can include conveying, agitating, and/or hydrating the foodstuff materials.

19 Claims, 4 Drawing Sheets

Related U.S. Application Data continuation-in-part of application No. 17/518,499, filed on Nov. 3, 2021, now Pat. No. 11,432,565.

(60) Provisional application No. 63/130,369, filed on Dec. 23, 2020.

(51) Int. Cl.

| | | |
|---|---|---|
| *A23J 3/22* | (2006.01) | |
| *A23L 27/00* | (2016.01) | |
| *A23L 29/212* | (2016.01) | |
| *B01F 23/50* | (2022.01) | |
| *B01F 23/53* | (2022.01) | |
| *B01F 27/112* | (2022.01) | |
| *B01F 27/17* | (2022.01) | |
| *B01F 27/70* | (2022.01) | |
| *B01F 31/445* | (2022.01) | |
| *B01F 35/92* | (2022.01) | |
| *B01F 35/90* | (2022.01) | |
| *B01F 101/06* | (2022.01) | |

(52) U.S. Cl.
CPC ............ B01F 23/511 (2022.01); B01F 23/53 (2022.01); B01F 23/59 (2022.01); B01F 27/112 (2022.01); B01F 27/17 (2022.01); B01F 27/70 (2022.01); B01F 31/445 (2022.01); B01F 35/92 (2022.01); *A23V 2002/00* (2013.01); *B01F 23/565* (2022.01); *B01F 2035/98* (2022.01); *B01F 2101/06* (2022.01)

(58) Field of Classification Search
CPC ........ B01F 23/53; B01F 27/70; B01F 23/511; B01F 23/565; B01F 2101/06; B01F 2035/98; A23J 3/14; A23V 2002/00
See application file for complete search history.

(56) References Cited

U.S. PATENT DOCUMENTS

| | | |
|---|---|---|
| 4,473,299 A | 9/1984 | Guibert |
| 5,634,715 A | 6/1997 | Stehr et al. |
| 6,635,301 B1 | 10/2003 | Howsam |
| 2004/0057332 A1 | 3/2004 | Taniguchi |
| 2005/0219938 A1 | 10/2005 | Rigaudon et al. |
| 2006/0175723 A1 | 8/2006 | Butler et al. |
| 2007/0128322 A1 | 6/2007 | Haapiainen et al. |
| 2008/0118607 A1 | 5/2008 | Sandoval et al. |
| 2009/0155448 A1 | 6/2009 | Solorio et al. |
| 2010/0129506 A1* | 5/2010 | Cabrales ............... B01F 27/723 426/281 |
| 2010/0130627 A1 | 5/2010 | Casalini et al. |
| 2013/0285273 A1* | 10/2013 | Yusa ...................... B29B 7/801 366/78 |
| 2014/0010920 A1 | 1/2014 | Nishimura et al. |
| 2018/0036912 A1* | 2/2018 | Dubey ................. B28C 5/1284 |
| 2018/0243701 A1 | 8/2018 | Oba et al. |
| 2019/0150476 A1* | 5/2019 | Kurnia ................. A23K 20/147 |

OTHER PUBLICATIONS

International Search Report and Written Opinion of the International Search Authority in International Application No. PCT/US2021/057962, mailed Jun. 30, 2022.

\* cited by examiner

FOODSTUFF PROCESSING APPARATUS

CROSS-REFERENCE TO RELATED APPLICATIONS

This application is a continuation of and claims priority to U.S. patent application Ser. No. 17/518,568, filed Nov. 3, 2021, which is in turn a continuation-in-part of U.S. patent application Ser. No. 17/518,499, filed Nov. 3, 2021, which claims the benefit of U.S. Provisional Patent Application No. 63/130,369, filed Dec. 23, 2020, all of which are hereby incorporated by reference in their entireties. This application is also related to U.S. patent application Ser. No. 17/402,478, filed on Aug. 13, 2021.

TECHNICAL FIELD

The present disclosure relates generally to food processing, and more particularly to devices and methods used in the formation and preparation of meat analogue products.

BACKGROUND

Plant-based meat production is a growing industry, and plant-based meat products are becoming increasingly popular due to the improving quality and appeal of these products. Within plant-based meat production and meat analogue production in general, the raw ingredients are typically prepared and then mixed together into a "dough" before forming into typical meat-like shapes. This dough is primarily composed of proteins and starches, typically used in either a texturized or powdered form. Soy, for example, commonly appears in the form of texturized soy protein (i.e., dried pieces formed during low-moisture extrusion) and protein isolate (i.e., a fine powder). Tumblers (i.e., tumbling marinators), bowl choppers, and globe mixers are used traditionally within meat production in general, for tenderizing meat among other tasks. Within plant-based meat production and meat analogue production, the same equipment is used in batch form to incorporate water into texturized or powdered protein and/or starches. Within this batch process, the proteins or starches, water, and potentially seasoning are typically constantly mixed, such that the water is either partially or fully dispersed and distributed to all of the dry ingredients evenly and the water absorption speed increases.

The rate of water absorption is a function of water concentration as well as a number of other variables, including temperature (i.e., availability or mobility), the surface area of the dry ingredient(s), hydrophilic and hydrophobic material properties, and cell structure of dry ingredients such as textured vegetable protein (i.e., open or closed cell structure). These properties are neither controlled nor optimized by post-processing in a tumbler.

The consequence of either incomplete or overly lengthy hydration results in quality control issues and higher costs of production. Incomplete hydration can cause the partially hydrated ingredients (such as protein material) to draw water out of other parts of the product. For example, as a result of incomplete hydration of textured vegetable protein ("TVP" or "texturized protein"), pieces of TVP enter the final mixture as partly dry protein. These dry parts of the TVP compete for water added later (or separately) in the process, and/or compete with other hydrated or water-binding ingredients for water. This may lead to inhomogeneity and/or a general decrease in juiciness within the final product. To minimize the risk of these quality issues associated with underhydration, food processors may elect to spend extra time hydrating material such as TVP in a batch process; however, this further batch delay increases the bottleneck to plant-based meat dough production, and requires additional equipment operation costs.

Tumblers, bowl choppers, and globe mixers also exhibit a number of limitations to usability for plant-based meat production and meat analogue production. Such equipment is typically used for batch hydration to better control for the large variability in meat products. While some of this equipment has been modified to interface with continuous production lines, this approach has been avoided for hydrating ingredients such as TVP, because the liquid content and hydration times are too high—for example, the simple method of angling a tumbler to progress material through gravitational force is not technically feasible for material that takes 10 minutes or more to absorb at least its dry weight in water. In addition, batch processing equipment requires manual heavy material transfer to convey to the next stage of production, and energy is wasted in this transfer. The heavy material transfer also leads to an increased risk to workers, particularly due to back and arm injury issues caused by the loading and unloading of this equipment.

Thus, there is a need in the field of food processing to create new and useful systems and methods for the hydration of plant-based protein. The source of the problem, as discovered by the inventors, is a lack of progressive, continuous hydration to produce the desired uniform water content in powdered or texturized protein or starch for plant-based meat; and to avoid the quality issues that result from under-hydrating material during food processing.

SUMMARY

It is an advantage of the present disclosure to provide improved systems and methods for hydrating material such as proteins and starches, e.g., TVP, for a meat analogue product. The disclosed features, apparatuses, systems, and methods provide improved consistency and taste of meat analogue products based on continuously and progressively hydrating protein or other material as it is being conveyed.

In some embodiments, these advantages can be accomplished by conveying material such as texturized protein through a stationary exterior tube with a rotating inner shaft, which holds one or more agitation and/or progression features (such as, e.g., an auger). In some embodiments, the shaft oscillates in rotation (such as, e.g., two rotations clockwise followed immediately by one rotation counter-clockwise). In some embodiments, water is concurrently added via one or more hydration ports which are configured to provide a metered flow rate of incoming water.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed methods and apparatuses for progressive hydration. These drawings in no way limit any changes in form and detail that may be made to the disclosure by one skilled in the art without departing from the spirit and scope of the disclosure.

DETAILED DESCRIPTION

Figure 1A:
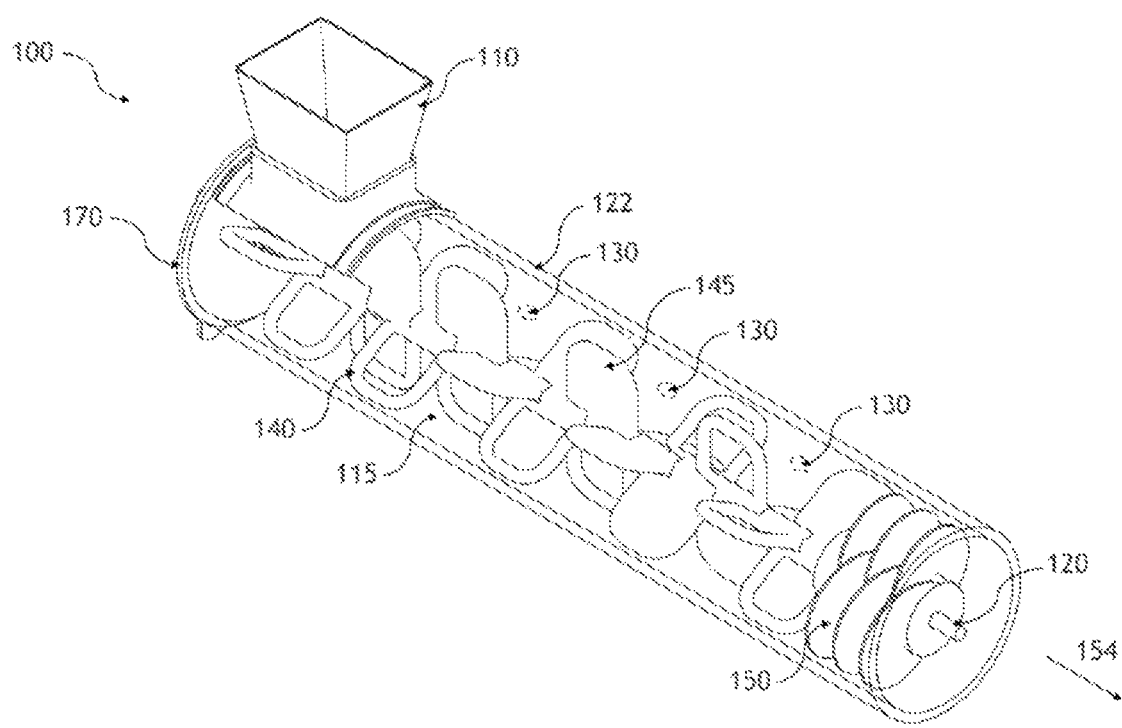
FIG. 1A illustrates a side top perspective view of an example progressive hydration system according to one embodiment of the present disclosure.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods for the progressive hydration of foodstuffs, such as plant-based proteins and starches. The disclosed embodiments can be used for hydrating various materials including starches and proteins, such as, for example, textured soy protein within a plant-based meat product (e.g., a "veggie burger" or similar vegetarian or vegan foodstuff which does not contain meat in its ingredients). Some of the disclosed embodiments can include a progressive hydration system wherein the dry ingredients become increasingly hydrated over the length of the machine.

In some embodiments, the system is a progressive hydration machine which enables the continuous expulsion of a plant-based textured protein for use in a plant-based meat product. The machine can be a water-metered, continuous progressive hydration machine, where material such as, e.g., textured vegetable protein may be consistently, accurately, and uniformly hydrated, while being continuously conveyed.

A primary issue of making plant-based meat is that the use of TVP or other proteins or starches in plant-based meat recipes requires timely and complete hydration of the material. Incomplete hydration, as a result of poor water migration to the center of larger pieces or clumps of TVP, for example, can cause this material to draw water out of other parts of the product. The solution proposed herein involves performing both the hydration and agitation and/or progression steps simultaneously so that material is agitated and/or progressed to break up lumps, clumps, and/or unhydrated pieces of the material.

In some embodiments, the system is designed such that dry or partially-hydrated material enters a material passage between an exterior tube and an oscillating, rotating inner shaft via an inlet. In some embodiments, water is immediately dispensed in a metered fashion to the material in the material passage. As the material wets, it continues to be agitated as it progresses (i.e., is conveyed) along the inner shaft. Once the material has conveyed through the chamber, the material has been precisely hydrated, and with less time than hydration would have taken if a tumbler-based batch hydration method or similar water migration method had been used.

The present solution also has the benefit of built-in conveyance, such that raw material is directly delivered to be continuously and progressively hydrated, and the material may be continuously expelled to avoid manual batch transfer. Further, in some embodiments the inner shaft can be designed to rotate at low speeds, which can help to alleviate metal fracture and safety concerns, and also to limit heat generation. Further, in some embodiments, chilled water and/or chilled materials can be used in the tool to offset heat generation; and/or an actively cooled insulated jacket could be incorporated to cool the material, which could be especially effective in embodiments with a high surface area to volume ratio of the material passage.

Although various embodiments disclosed herein discuss progressive hydration of TVP and other plant-based proteins and starches intended to be used in plant-based meat production, it will be readily appreciated that the disclosed features, apparatuses, systems, and methods can similarly be used for any relevant hydration of materials. For example, the disclosed progressive hydration system may also be used with plant-based proteins in powdered or other forms other than texturized form, or potentially with some meat- or fungi-based proteins, or starches or other polysaccharides. In some situations, the disclosed progressive hydration system can also be used to hydrate and process materials that are not foodstuff-based. Other applications, arrangements, and extrapolations beyond the illustrated embodiments are also contemplated.

Referring to FIG. 1A, a side top perspective view of an example progressive hydration system 100 is illustrated according to one embodiment of the present disclosure. The progressive hydration system 100 can be, for example, one portion or component of a larger system, e.g., it may be a single component in a series of components within a food production process. In this embodiment, the progressive hydration system 100 consists of an inlet 110 (i.e., an opening in the tube, optionally provided with an inlet funnel or hopper), an inner shaft 120, an exterior tube 122, one or more metered water inlets 130, one or more agitation features 140 (e.g., unfilled hoops, hooks, or paddles), one or more progression features 145 (e.g., filled paddles), and one or more conveyance components 150 (e.g., a fluted auger) which facilitates conveyance of the material away from the input inlet. In some embodiments, the conveyance components 150 direct the material towards another component located at the output 154 of the system 100. In some embodiments, the separate inlet 110 and metered inlets 130 are presented as a single set of one or more inlets that share functionality.

The inlet 110 is configured to provide a means for material (e.g., protein or starches) to be brought into the system 100, specifically into the material passage 115 between the inner shaft 120 and the exterior tube 122. In some embodiments, the inlet buffers doses of the material in stages or continuously. In some embodiments, the inlet 110 is a funnel which vertically feeds material into the exterior tube 122. In some embodiments, the inlet may instead have a horizontal design, and/or may not make use of a funnel. In some other embodiments, the entire system 100 may be vertical in nature, or may be tilted at an angle to facilitate material flow.

The inner shaft 120 is configured to rotate about its long axis. In some embodiments, the inner shaft rotates in a manner and direction such that the conveyance features 150, as well as potentially progression features 145, are engaged to convey and/or progress material towards the output 154. In some embodiments, the inner shaft 120 rotates around an axle, rotational shaft, or other rotational component of the system. In some embodiments, as material enters the material passage 115 via the inlet 110, the material is conveyed toward the output 154 (as depicted by the right arrow in the figure). In some embodiments, the material tumbles along in a turbulent material flow as the inner shaft 120 rotates.

In some embodiments, the inner shaft 120 is configured for oscillatory rotation, such as, e.g., two full rotations clockwise followed by one half rotation counterclockwise. In some embodiments, the inner shaft follows an oscillation pattern which functions to break up any lumps, clumps, and/or unhydrated pieces of the material to ensure forward progression and to produce uniform hydration and consistent dispersal of the material. In some embodiments, the oscillation pattern is dependent on the hydration and absorption curves of the material that is being processed. In some embodiments, the ratio at which the inner shaft moves forwards and backwards, and the speed at which it moves forward and backwards correlate to these hydration and absorption curves. In some embodiments, the oscillation pattern and speed(s) is correlated with the rate at which material progresses through the hydration machine 100.

In some embodiments, the inner shaft 120 is configured to rotate at a predefined or adjustable speed profile measured in rotations per minute (RPM) to provide just-in-time hydration of the material. Some embodiments may be configured for intermittent "pulse" rotation, where the inner shaft 120 may rotate in regular short bursts of fast rotation alternating with slow rotation or a stationary hold. Still other embodiments may include a combination of the above controls, optimized to process a particular material. The controls may be variable, such that a preferred control sequence may be selected from a predefined set of motion profiles, each tuned to best process a particular material. In some embodiments, the metered flow rate of water may be similarly variably controlled, and may be linked to the motion profile of the inner shaft. Providing a predefined inner shaft rotation control sequence and metered flow rate of water can precisely hydrate the material, in a manner which dramatically reduces hydration time and ensures just-in-time hydration at a rate optimal to minimize the energy required for food processing, while maintaining the precise hydration ratio required in food production.

The short residence time of the material (e.g., a protein such as TVP) in the machine allows for easy start-up and shut-down of production (due to, e.g., no pre-soaking of the material required), and better control of material usage for just-in-time "Lean" production methods, which have been known for decades to save costs, material waste, and energy in manufacturing systems. The shortened residence time of the material in the machine also may decrease the risk of food-borne bacterial growth. Additionally, unlike hydrating material in, e.g., a bowl chopper, which often results in significant waste due to material spraying out or escaping the open bowl during chopping, the present solution fully contains the material to ensure nearly zero waste during food processing.

In some embodiments, metered inlets 130 are configured to provide water for precisely hydrating the material as it is conveyed along the inner shaft 120. The water may be metered according to any number of methods. In some embodiments, the water is metered according to a predefined hydration curve (e.g., hydration as a function of one or more of particle size, time, and/or position). The hydration curve may be linked to the predefined rotation control sequence of inner shaft 120, as discussed above. Any other suitable hydration curve may be used. Matching the water metering to the curve can provide accurate, consistent, and fine-tuned results, as may be necessary and/or desired to maintain or improve the quality of certain plant-based meat, meat analogues, or other food products.

The agitation features 140 function to agitate the material. In some embodiments, this agitation breaks up any, e.g., lumps, clumps, and/or unhydrated pieces of material which may be present. In some embodiments, agitation features 140 may take the form of, e.g., unfilled hoops, hooks or paddles, as illustrated.

The progression features 145 facilitate the progression of the material within the exterior tube 122 toward the outlet 154. In some embodiments, the progression features may take the form of, e.g., a series of filled paddles. In some embodiments, this series of filled paddles and/or other progression features may be imbricated upon themselves, i.e., partially overlapping along inner shaft 120, in order to progress the material. In some embodiments, the progression features are protruding outwards from the rotating inner shaft 120. In some embodiments, the progression features are interlocking. In some embodiments, the progression features are arranged in a helical pattern, which functions to enable the progression of the material within the system.

In some embodiments, optional conveyance components 150 are configured to convey the material to the system output 154. In some embodiments, the material is conveyed towards a next component of a larger system after the progressive hydration of the material is completed. In some embodiments, the conveyance components 150 may include, e.g., a bidirectional fluted auger, or other features which convey the material toward an output of the progressive hydration system.

In some embodiments, the material is conveyed to the input of a next machine for one or more food production tasks, such as, e.g., typical plant-based meat mix and form methods of production. In some embodiments, the material moves toward a continuous mixer to be mixed with other components of the food product. In some embodiments, the material flow out of output 154 may be automatically regulated through adjustable mechanical or electromechanical means (e.g., an additional screw auger and a weight-based dispenser for precise material transfer, or other suitable means). In some embodiments, the material flow out of output 154 may be regulated through integration with the rotation controls of the inner shaft 120. In some embodiments, prior to the material being conveyed towards a next component, seasoning or flavoring is mixed into the material (e.g., seasoned water, powdered flavor particles, or any other suitable seasoning or flavoring). Many other possibilities may be contemplated depending on context.

In some embodiments, in the event that cooling or tight temperature controls are desired, a chiller (such as, e.g., a jacket chiller) is used to maintain the temperature of ingredients and final dough throughout the various stages of the process. Such a chiller may be integrated with one or more components of the system at various stages of the process (e.g., integrated with an inlet, one or more funnels, or any other suitable component of the system). In some embodiments, an insulating jacket can be placed around the exterior tube 122. Alternatively, or in addition, an internal cooling flow can be circulated through a cooling jacket around the exterior tube 122 and/or inner shaft 120. Still further in some embodiments, the temperature of the input materials, such as TVP and water, can be suitably chilled prior to introducing these materials at either the inlet 110 or the metered inlets 130.

Figure 1B:
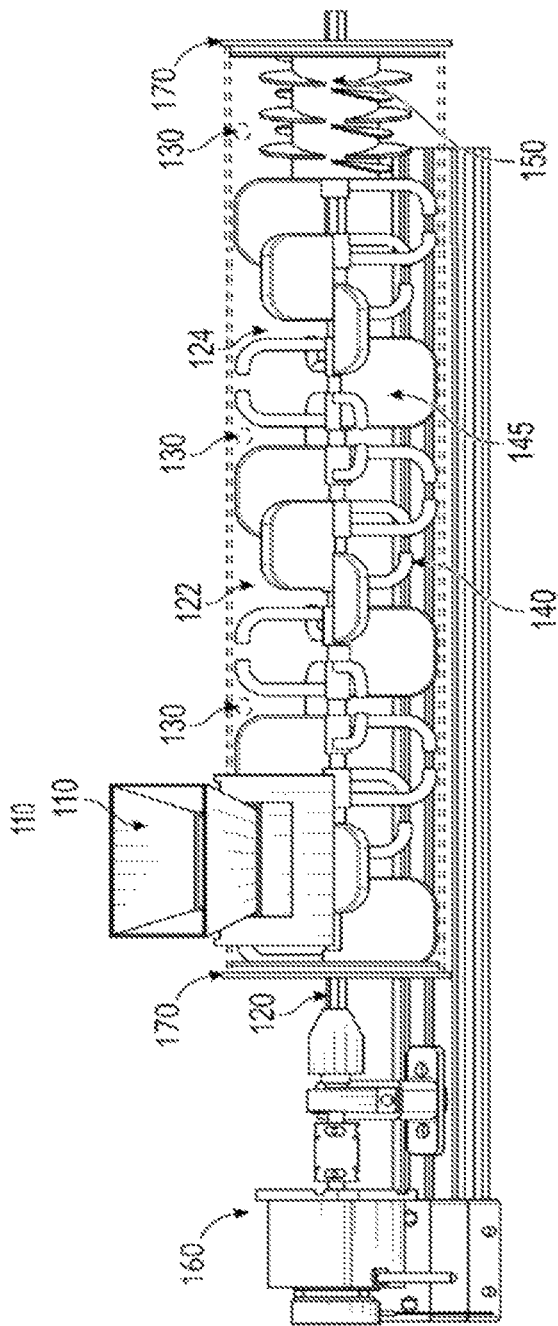
FIG. 1B illustrates a side cross section view of an example progressive hydration system according to one embodiment of the present disclosure.

Turning next to FIG. 1B, a side-top-angle view of an example progressive hydration system is illustrated according to one embodiment of the present disclosure. The inlet 110 as described above can be seen, as can material passage 115, the rotating inner shaft 120, the stationary exterior tube 122, one or more metered inlets 130, agitation features 140, progression features 145, optional conveyance components 150, and a motor and drive system 160. In various differing embodiments, the inlets 110 and/or 130 may vary in size and/or number. In some embodiments, a motor and drive system 160 rotates the inner shaft 120.

Figure 1C:
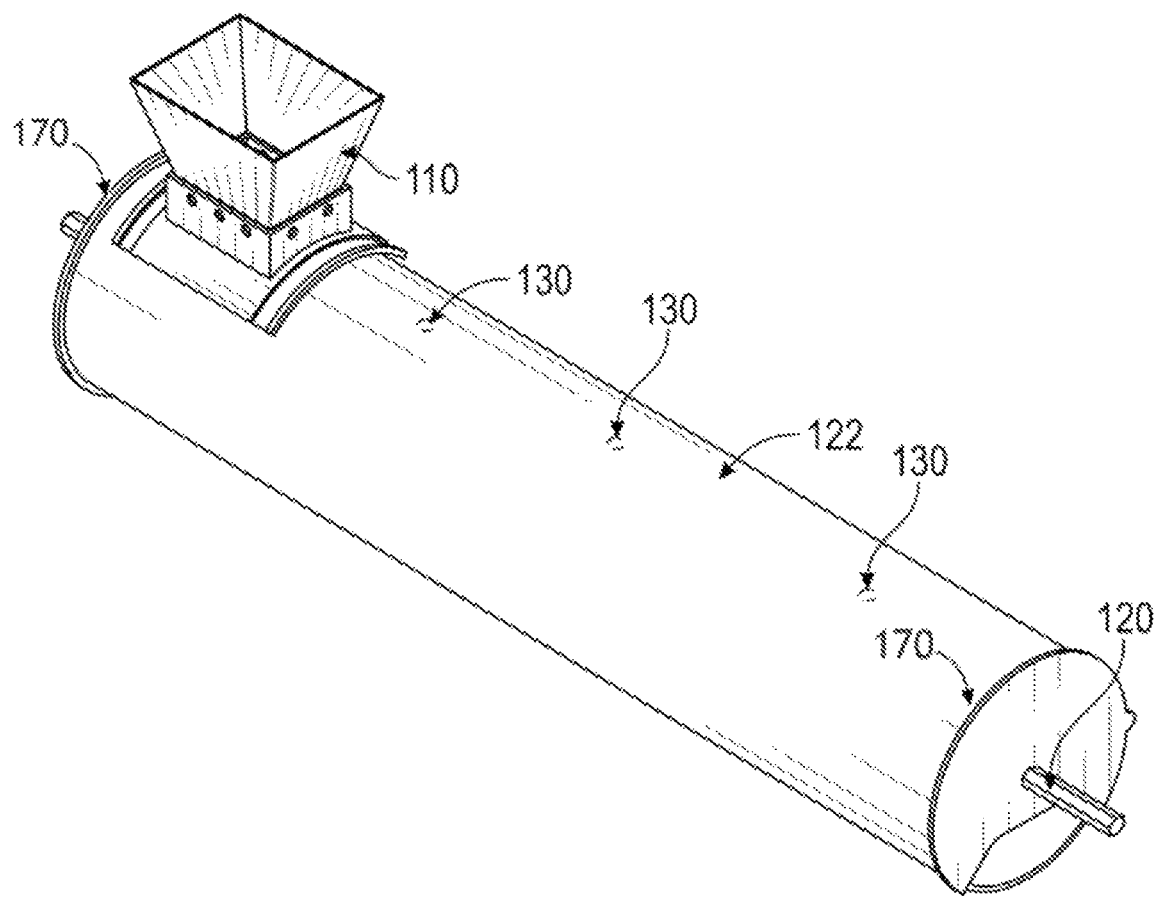
FIG. 1C illustrates a side top perspective view of the exterior of an example progressive hydration system according to one embodiment of the present disclosure.

FIG. 1C illustrates a side top perspective view of the exterior of an example progressive hydration system, according to one embodiment of the present disclosure. An inlet 110, inner shaft 120, exterior tube 122, metered inlets 130, and tube end caps 170 are illustrated within the side top perspective view. Material is mixed and conveyed in a material passage between the inner shaft 120 and exterior tube 122. In some embodiments, one or more conveyance features are present at or near the end of the inner shaft 120. In some embodiments, the diameter of the inner shaft is increased, and one or more auger flutes or other conveyance components are present. These components function to convey the material towards the output 154, or in some embodiments toward one or more additional components. In some embodiments, one or more agitation features (such as, e.g., hooks, loops, or open paddles) are additionally included attached to inner shaft 120. In some embodiments, tube end caps 170 function to close off the ends of the tube and support the inner shaft 120.

In some embodiments, there may be a hydrating section, followed by sections with agitation and/or progression features, followed by another hydrating section. Other such embodiments may be contemplated. The hydrating section functions to provide water which hydrates new surface areas of the material which are exposed during rotation of the inner shaft. In some embodiments, one or more grooves, ridges, or other fluid passage features can be formed along the outer surface of the inner shaft 120 in the hydration section, the inner surface of the exterior tube 122 in the hydration section, or both. Such grooves, ridges, and/or other surface features can direct viscous fluids (e.g., water) through the fluid passage, and also direct or convey the partially- or fully-hydrated material. In some embodiments, such surface features may also aid in agitating and/or progressing the material by applying intermittent force or generating turbulence as the material rotates through the material passage. In some embodiments, the water is provided in metered amounts or with a metered continuous flow rate to hydrate the material.

In some embodiments, the progressive hydration system as shown can be configured to facilitate standard industrial food processing clean-in-place, such as through the addition of dedicated ports for pressurized cleaning fluid input and drainage. In various embodiments, the progressive hydration system as shown can be readily disassembled or taken apart, such as for cleaning in an industrial dishwasher. Accordingly, in some embodiments, the exterior tube may be detached from the inner shaft, inlet, and/or other components. Other similar components may be decoupled, such that these components may also be removed and placed into an industrial dishwasher or other cleaning device.

In some embodiments, one or more components of the progressive hydration system may be interchangeable with other identically or similarly shaped components. For identically shaped and sized components, this can serve to streamline production processes where one component is swapped in while another component is being cleaned or repaired. For distinct geometry components, additional geometries can serve to more efficiently process different materials, such as, e.g., different sizes or shapes of TVP, dried fungi or mushroom protein, or powdered proteins or starches.

Figure 2:
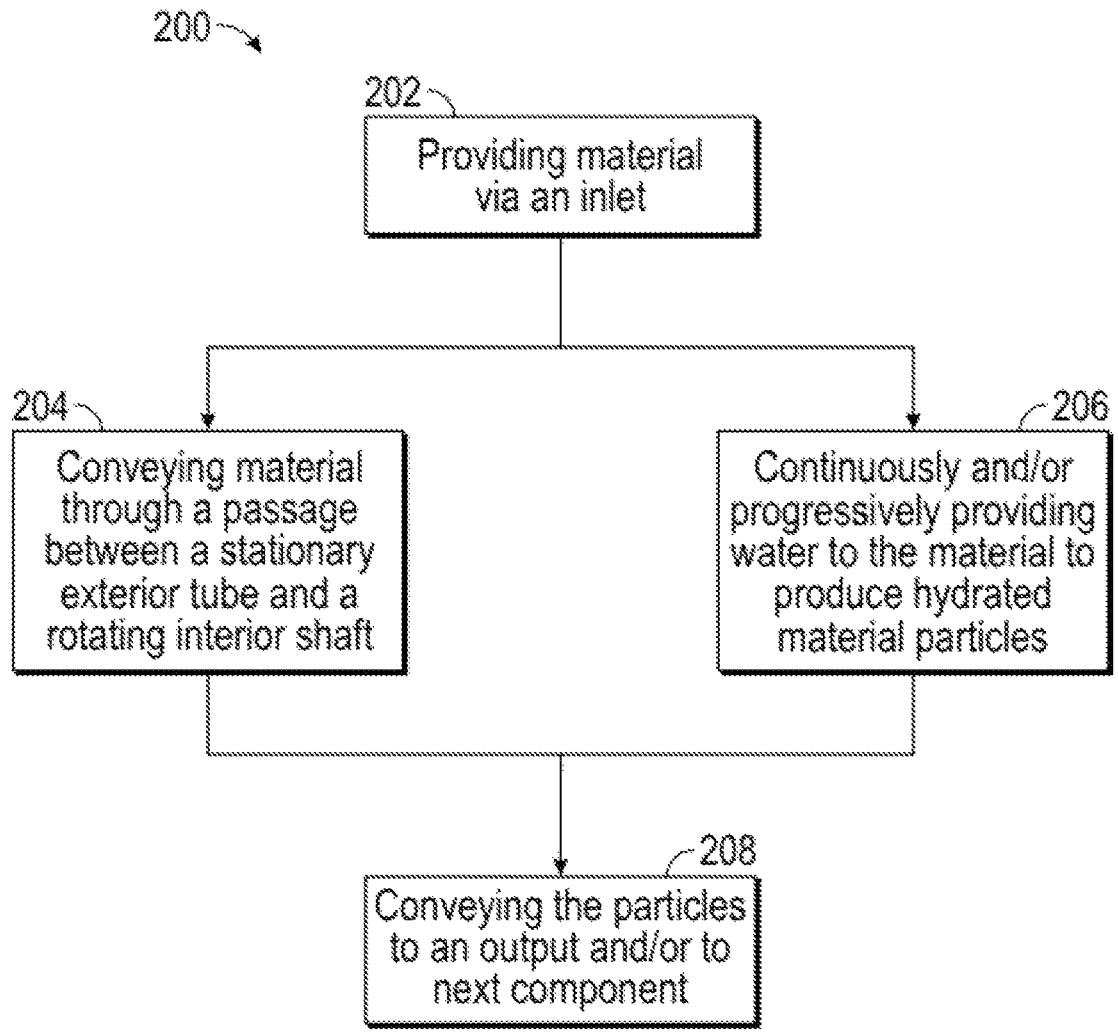
FIG. 2 illustrates a flowchart of an example method of continuously and progressively hydrating material according to one embodiment of the present disclosure.

FIG. 2 provides a flow chart of an example method 200 for continuously and progressively hydrating material according to one embodiment of the present disclosure. At step 202, the system provides material (e.g., via conveyance from other components) into a material passage via an inlet, as described above. In some embodiments, steps 204 and 206 may be performed concurrently or in parallel to one another.

At step 204, the material is conveyed through a material passage between an exterior tube and a rotating inner shaft, as described above.

At step 206, concurrent to or subsequently after conveying the material, the system continuously and/or progressively provides water to the material to produce hydrated material particles. The step of hydration is described in further detail above.

At step 208, the particles are conveyed to an output (such as output 154 as illustrated in FIG. 1A). In some embodiments, the output feeds directly into a next component in a larger system (such as, e.g., a final dough mixer in a continuous meat analogue production system, further described in related U.S. patent application Ser. No. 17/518,544). In some embodiments, the particle output is metered through mechanical or electro-mechanical means, such as through a loss-in-weight automated dosing system. In some embodiments, the particles are directly conveyed to other components which may, e.g., collect and precisely meter out the material; mix the material with other materials; or form the material into a burger patty, "chicken" nugget, or other suitable shape or form as desired. Additional components may fry, pack, package, and freeze the material. The end result may be a final end product constituting a plant-based meat product, meat analogue product, or other suitable end product as desired.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. An apparatus configured to process foodstuff materials, the apparatus comprising:

an exterior tube having a foodstuff inlet and an outlet, the exterior tube defining a longitudinal axis along its center, wherein the exterior tube is configured to facilitate the conveyance of foodstuff materials along a material passage from the foodstuff inlet to the outlet,
a single inner shaft located within the exterior tube and extending along the longitudinal axis at the center of the exterior tube, the inner shaft combining with the exterior tube to define the material passage, wherein the inner shaft is configured to be rotationally driven, and
multiple differently shaped protrusions coupled to and extending from the inner shaft, wherein the multiple differently shaped protrusions include one or more unfilled hoops, unfilled hooks, and unfilled paddles that are configured to process the foodstuff materials when the inner shaft is rotationally driven.

2. The apparatus of claim 1, wherein the multiple differently shaped protrusions include filled paddles.

3. The apparatus of claim 2, wherein the multiple differently shaped protrusions include one or more unfilled hoops, unfilled hooks, and unfilled paddles that each extend from the inner shaft at the location of a filled paddle and in a direction that is opposite of the direction of that filled paddle.

4. The apparatus of claim 1, wherein the multiple differently shaped protrusions include a fluted auger located proximate the outlet.

5. The apparatus of claim 1, wherein the multiple differently shaped protrusions include protrusions configured to agitate the foodstuff materials.

6. The apparatus of claim 1, wherein the multiple differently shaped protrusions include protrusions configured to convey the foodstuff materials.

7. The apparatus of claim 1, further comprising:
one or more water inlets located along the exterior tube downstream of the foodstuff inlet, wherein the one or more water inlets are configured to facilitate the addition of water to the foodstuff materials after the foodstuff materials have already been processed by at least a portion of the multiple differently shaped protrusions.

8. The apparatus of claim 1, wherein the multiple differently shaped protrusions include protrusions configured to break up unhydrated portions of the foodstuff materials.

9. The apparatus of claim 1, wherein the multiple differently shaped protrusions include protrusions configured to facilitate uniform hydration of the foodstuff materials.

10. The apparatus of claim 1, wherein the multiple differently shaped protrusions extend from the inner shaft in a helical and imbricated pattern.

11. The apparatus of claim 1, wherein the inner shaft is configured to be rotationally driven in both clockwise and counterclockwise directions.

12. The apparatus of claim 1, wherein the foodstuff materials include one or more meat analogue products.

13. A method of processing foodstuff materials, the method comprising:
providing foodstuff materials into a material passage located between an exterior tube defining a longitudinal axis along its center and a single inner shaft extending along the longitudinal axis of an apparatus configured to process foodstuff material, wherein the exterior tube includes a foodstuff inlet and an outlet and the inner shaft includes multiple differently shaped protrusions extending therefrom;
rotating the inner shaft in a first direction while the foodstuff materials are within the material passage, wherein the rotating results in multiple different processing functions of the foodstuff materials by the multiple differently shaped protrusions; and
collecting the foodstuff materials from the outlet of the foodstuff processing apparatus after the multiple different processing functions have been performed by the multiple differently shaped protrusions.

14. The method of claim 13, wherein the multiple different processing functions include conveying the foodstuff materials through the material passage and agitating the foodstuff materials while the foodstuff materials are within the material passage.

15. The method of claim 13, wherein the multiple differently shaped protrusions include one or more unfilled hoops, unfilled hooks, and unfilled paddles.

16. The method of claim 13, further comprising:
providing water into the material passage while the foodstuff materials are within the material passage to produce a plurality of hydrated foodstuff material particles, wherein the water is provided via multiple water inlets dispersed along the exterior tube between the foodstuff material inlet and the outlet.

17. The method of claim 16, wherein the multiple different processing functions include breaking up unhydrated portions of the foodstuff materials and facilitating uniform hydration of the foodstuff materials while the foodstuff materials are within the material passage.

18. The method of claim 13, further comprising:
rotating the inner shaft in a second direction while the foodstuff materials are within the material passage, wherein the second direction is opposite to the first direction.

19. A foodstuff processing apparatus, comprising:
a material passage having a foodstuff inlet, an outlet, and a longitudinal axis along its center, wherein the material passage is configured to facilitate the conveyance of foodstuff materials from the foodstuff inlet to the outlet;
an inner shaft located within the material passage and extending along the longitudinal axis, wherein the inner shaft is configured to be rotationally driven; and
multiple differently shaped protrusions coupled to and extending from the inner shaft, wherein the multiple differently shaped protrusions include one or more unfilled hoops, unfilled hooks, and unfilled paddles that are configured to process the foodstuff materials when the inner shaft is rotationally driven.

* * * * *